(12) United States Patent
Fomitescu

(10) Patent No.: US 10,901,664 B2
(45) Date of Patent: Jan. 26, 2021

(54) PRINT JOB SUBMISSION MECHANISM

(71) Applicant: Ricoh Company, Ltd., Tokyo (JP)

(72) Inventor: Manuel Fomitescu, Timisoara (RO)

(73) Assignee: Ricoh Company, Ltd., Tokyo (JP)

( * ) Notice: Subject to any disclaimer, the term of this patent is extended or adjusted under 35 U.S.C. 154(b) by 80 days.

(21) Appl. No.: 16/291,965

(22) Filed: Mar. 4, 2019

(65) Prior Publication Data

US 2020/0285431 A1    Sep. 10, 2020

(51) Int. Cl.
*G06F 3/12*    (2006.01)

(52) U.S. Cl.
CPC .......... *G06F 3/1214* (2013.01); *G06F 3/1236* (2013.01); *G06F 3/1268* (2013.01); *G06F 3/1275* (2013.01); *G06F 3/1288* (2013.01)

(58) Field of Classification Search
CPC .... G06F 3/1214; G06F 3/1275; G06F 3/1268; G06F 3/1236; G06F 3/1288
See application file for complete search history.

(56) References Cited

U.S. PATENT DOCUMENTS

| | | | |
|---|---|---|---|
| 8,810,825 B2 | 8/2014 | Watanabe | |
| 8,854,669 B1* | 10/2014 | Jazayeri | G06F 3/1204 358/1.15 |
| 9,069,499 B2 | 6/2015 | Waller et al. | |
| 9,377,970 B1 | 6/2016 | Pan | |
| 2012/0300251 A1* | 11/2012 | St. Laurent | G06F 3/1292 358/1.15 |
| 2013/0188221 A1* | 7/2013 | Ohno | G06F 3/1222 358/1.15 |
| 2013/0194633 A1* | 8/2013 | Takatsu | G06F 3/1288 358/1.15 |
| 2014/0071476 A1* | 3/2014 | Aritomi | G06F 3/1288 358/1.14 |
| 2014/0085665 A1* | 3/2014 | Sheldon | G06F 3/1204 358/1.15 |
| 2015/0286444 A1* | 10/2015 | Sinn | G06F 3/1204 358/2.1 |
| 2016/0259601 A1 | 9/2016 | Dalaa et al. | |
| 2017/0024172 A1 | 1/2017 | Oshima et al. | |
| 2017/0126674 A1 | 5/2017 | Lee | |

FOREIGN PATENT DOCUMENTS

| | | | | |
|---|---|---|---|---|
| WO | 2016032532 A1 | 3/2016 | | |
| WO | WO-2018236136 A1 * | 12/2018 | ........... | G06F 3/1288 |

OTHER PUBLICATIONS

Sood, S. K. (2012). A combined approach to ensure data security in cloud computing. Journal of Network and Computer Applications, 35(6), 1831-1838.

* cited by examiner

*Primary Examiner* — Neil R McLean
(74) *Attorney, Agent, or Firm* — Jaffery Watson; Mendonsa & Hamilton LLP

(57) ABSTRACT

A system to is described. The system includes a cloud server, including at least one physical memory device to store print job submission logic and one or more processors coupled with the at least one physical memory device, the one or more processors to execute the print job submission logic to receive one or more print job requests from a client device and transmit the one or more print job requests to a processed at a print server.

20 Claims, 6 Drawing Sheets

PRINT JOB SUBMISSION MECHANISM

FIELD

This invention relates generally to the field of print services. More particularly, the invention relates to interfacing with a print services environment.

BACKGROUND

Entities with substantial printing demands typically implement a high-speed production printer for volume printing (e.g., one hundred pages per minute or more). Production printers may include continuous-forms printers that print on a web of print media stored on a large roll. A production printer typically includes a localized print controller that controls the overall operation of the printing system, and a print engine that includes one or more printhead assemblies, where each assembly includes a printhead controller and a printhead (or array of printheads).

Recently, the establishment of infrastructures called cloud services in which services are provided by a server system connected to the Internet, has been in progress. Print services for printing over the Internet have also been provided. The services offer functions of generating and distributing print data with a server on the Internet at the request of a print device. Now, systems that provide such print services by using the aforementioned Cloud are being developed.

Such systems typically implement cloud applications that communicate with applications operating on one or more print servers in a private networking environment. For instance, a cloud application that receives print jobs from one or more clients may transmit the jobs to a print manager operating on a conventional network print server for print processing. Currently, a shared device must be implemented to receive jobs from the cloud applications prior to being read by the print manager. Other solutions may implement an application at the print server to pool the jobs from the cloud applications prior to submission to the print manager.

Accordingly, a mechanism to enable cloud applications to directly submit print jobs to a print server on a private network is desired.

SUMMARY

In one embodiment, a system is disclosed. The system includes one or more print servers to host a print manager to process print jobs, a plurality of client devices to transmit print job requests for processing at the one or more print servers and one or more cloud servers to host print job submission logic to receive the print job requests from the plurality of client devices and transmit the print job requests to at least one of the one or more print servers to be processed at a print manger.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

A mechanism to enable cloud applications to directly submit print jobs to one or more print servers on a private network is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", "interface", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 1:
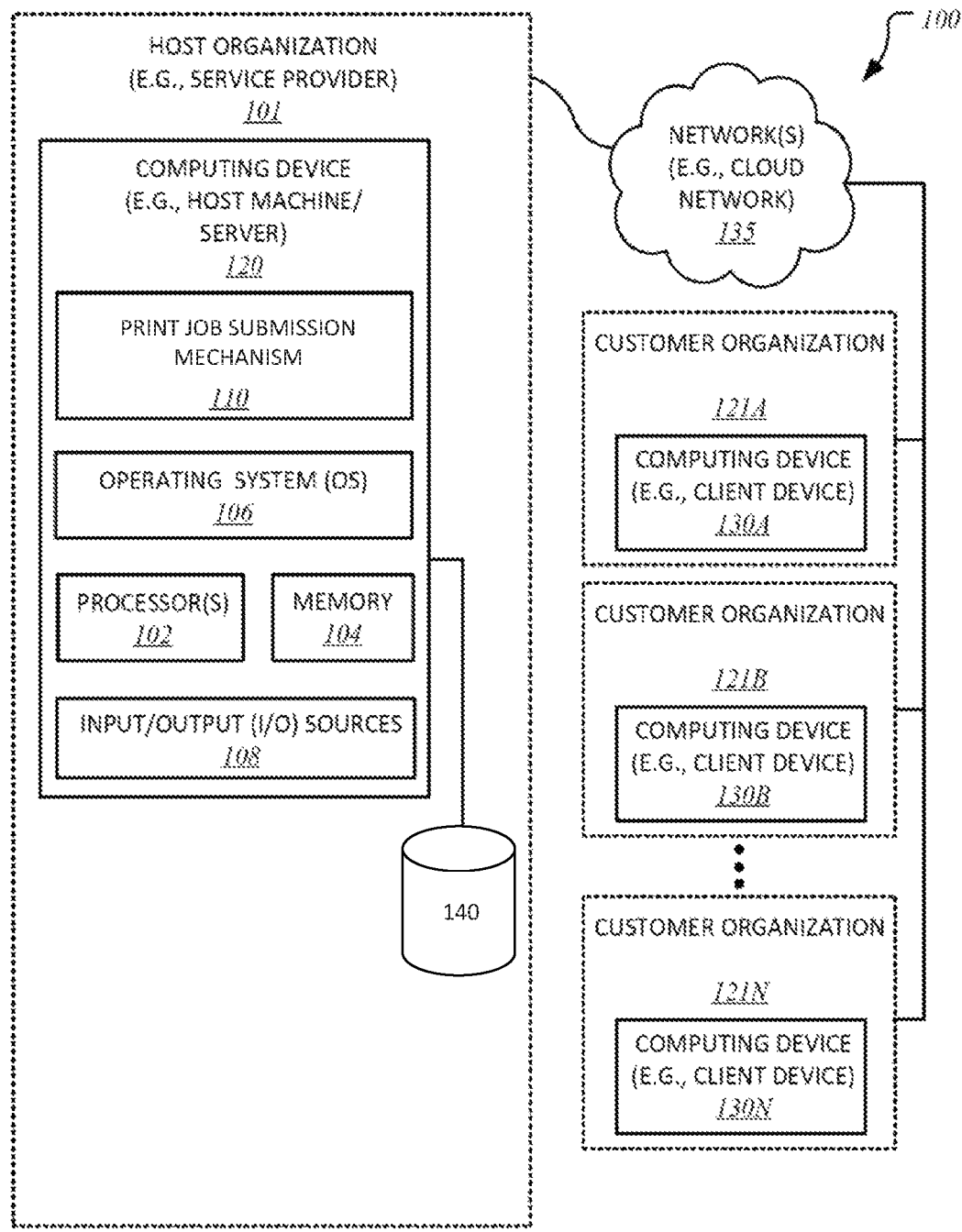
FIG. 1 illustrates one embodiment of a system having a computing device employing a print job submission mechanism.

FIG. 1 illustrates a system 100 having a computing device 120 employing a print job submission mechanism 110 according to one embodiment. In such an embodiment, computing device 120 includes a host server computer serving as a host machine for employing print job submission mechanism 110 to provide for the transmission of print jobs from computing device 120 to a print server.

Computing device 120 may include (without limitation) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 130A-130N, etc. Computing device 120 further may include processor(s) 102, memory 104, input/output ("I/O") sources 108, such as touchscreens, touch panels, touch pads, virtual or regular keyboards, virtual or regular mice, etc.

In one embodiment, host organization 101 may further employ a print production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated database(s) 140 store (without limitation) information and underlying database records having customer and user data therein on to process documents and/or print jobs on behalf of customer organizations 121A-N. In some embodiments, host organization 101 receives input and other requests from a plurality of customer organizations 121A-N over one or more networks 135; for example, incoming print job and/or document processing requests, or other inputs may be received from customer organizations 121A-N to be processed using database system 140.

In one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc. In one embodiment, requests are received at, or submitted to, a web server within host organization 101. Host organization 101 may receive a variety of requests for processing by host organization 101. For example, incoming requests received at the web server may specify print services from host organization 101 are to be provided.

Figure 2:
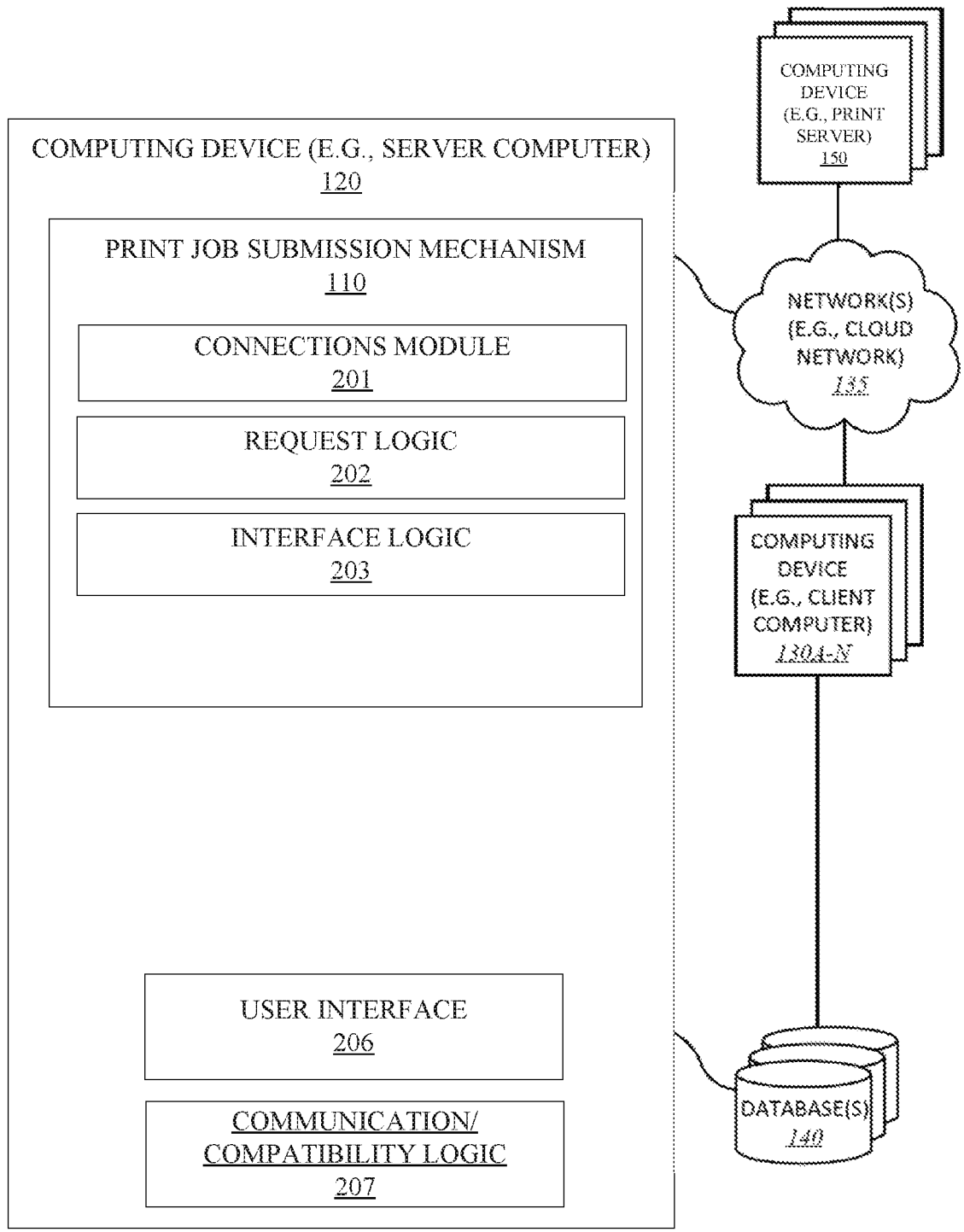
FIG. 2 illustrates one embodiment of a print job submission mechanism according to one embodiment.

FIG. 2 illustrates print job submission mechanism 110 of FIG. 1 according to one embodiment. In one embodiment, print job submission mechanism 110 is a web service that provides an interface for direct print job submission from computing device 120 to a print manager at print server 150. In such an embodiment, print job submission mechanism 110 may include any number and type of components, such as connections module 201, request logic 202, interface logic 203.

Additionally, computing device 120 includes other components, such as user interface 206 and communication/compatibility logic 207, to facilitate the implementation of print job submission mechanism 110. For example, communication/compatibility logic 207 may facilitate the ability to dynamically communicate and stay configured with any number and type of software/application developing tools, models, data processing servers, database platforms and architectures, programming languages and their corresponding platforms, etc., while ensuring compatibility with changing technologies, parameters, protocols, standards, etc.

Computing device 120 may include a server computer which may be further in communication with one or more databases or storage repositories, such as database(s) 140, which may be located locally or remotely over one or more networks, such as network(s) 135 (e.g., cloud network, Internet, proximity network, intranet, Internet of Things ("IoT"), Cloud of Things ("CoT"), etc.). Computing device 120 is further shown to be in communication with any number and type of other computing devices, such as client computing devices 130A-N, over one or more networks, such as network(s) 135.

In one embodiment, computing device 120 may operate as a service provider core for hosting and maintaining print job submission mechanism 110 as a software as a service (SaaS), and be in communication with one or more client computers 130A-N, over one or more network(s) 135, and any number and type of dedicated nodes.

Figure 3:
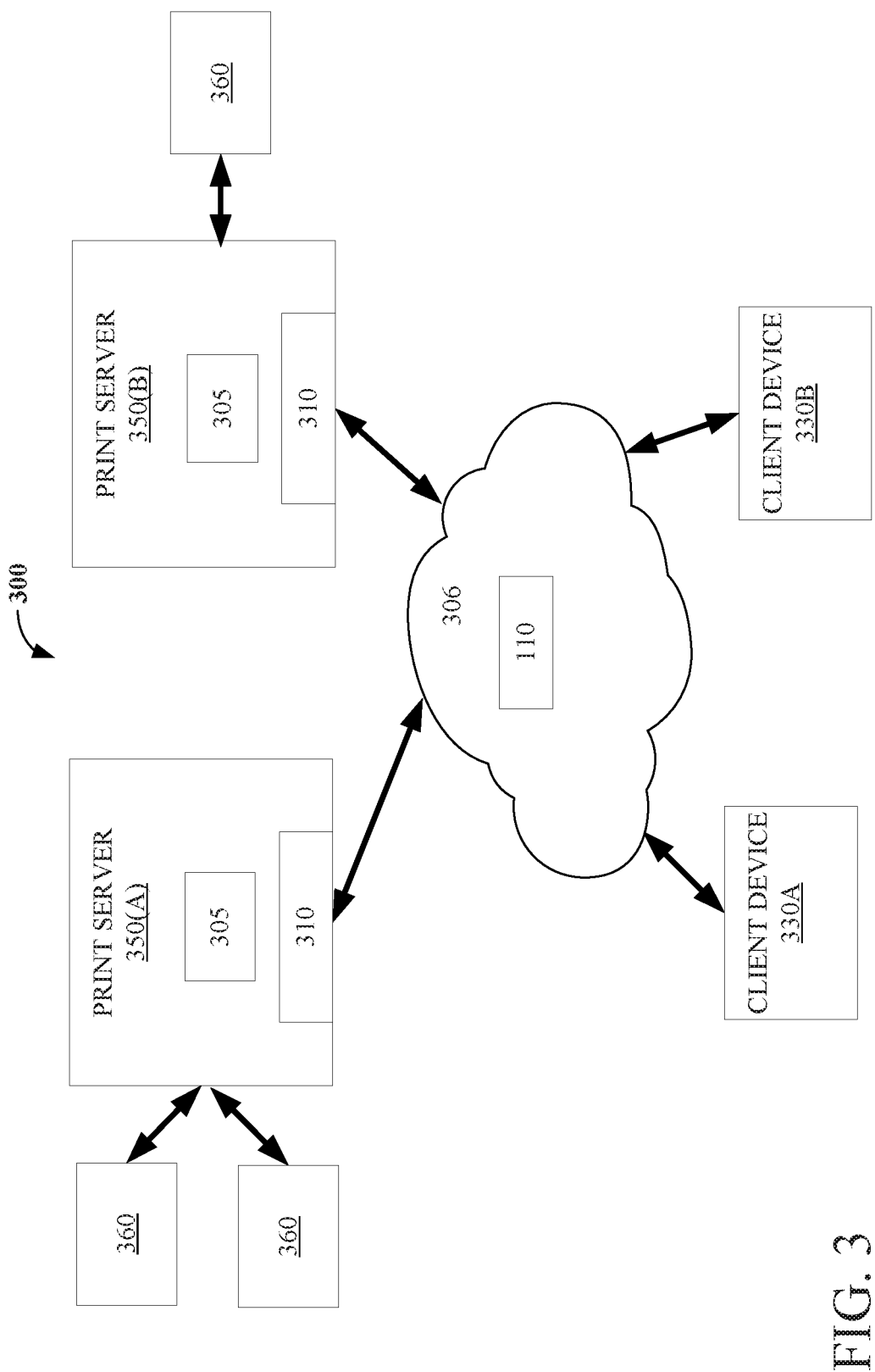
FIG. 3 illustrates another embodiment of a print job submission mechanism implemented in a cloud computing environment.

According to one embodiment, print job submission mechanism 110 is implemented in a cloud computing environment to receive print jobs from clients 130 and submit the print jobs to one or more print servers 150 having print managers to provide print job management for a document workflow to be handled at a printing system. FIG. 3 illustrates an embodiment of print job submission mechanism 110 implemented in a cloud computing environment 300. As shown in FIG. 3, environment 300 includes a cloud server 306 that communicates with print servers 350 (e.g., 350(A) and 250(B), each including a print manager 305, and client devices 330 (e.g., 353(A) and 330(B)).

Figure 4:
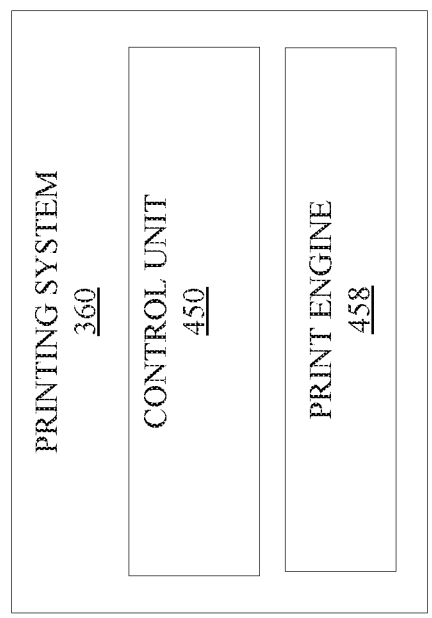
FIG. 4 illustrates one embodiment of a printing system.

According to one embodiment, print servers 350 each include a client application 310 to establish a connection with print job submission mechanism 110, as will be described in more detail below. Further, each print manager 305 coordinates document workflow to one or more printing systems 360. FIG. 4 illustrates one embodiment of such a printing system 360.

Printing system 360 includes a control unit 450 and a print engine 458. According to one embodiment, control unit 450 processes and renders objects received in print job data and provides sheet maps for printing to print engine 458. Control unit (e.g., DFE or digital front end) 450 is implemented to process image objects received at control unit 450 by a raster image processor (RIP) to convert an image described in a vector graphics format (e.g., shapes) into a raster image (e.g., pixels) that is to be stored as scan line data in a memory array (not shown) for output to print engine 458. In embodiments, print engines 458 may be located at a facility associated with a customer organization 121, although other locations are also possible. In such embodiments, control unit 450 processes print job information and transmits the raster images to remote print engines to produce the output.

Referring back to FIG. 2, print job submission mechanism 110 provides a cloud service application implemented to directly submit print jobs from a cloud computing environment to a workflow print manager (e.g., print manager 305). Connections module 201 provides a connection between cloud server 306 and one or more print servers (e.g., print servers 350(A) and 350(B)).

In one embodiment, connections module 201 tracks each print server that is registered with print job submission mechanism 110. In a further embodiment, connections module 201 provides bidirectional asynchronous communication using WebSockets connections between cloud server 306 and the one or more print servers. However other embodiments may implement different types of communication interfaces.

Request logic 202 is implemented to receive requests from one or more client devices (e.g., clients 330(A) and 330(B)) that are to be processed by print manager 305. In one embodiment, request logic 202 receives a request from a client 330 to process one or more print jobs for printing at a print server. In such an embodiment, request logic 202 may receive hypertext transfer protocol (HTTP) Job Messaging Format (JMF) requests.

Interface logic 203 connects cloud server 306 with a print server 350 for proxying requests from clients 306 to print servers 350. Thus, interface logic 203 operates as a print manager proxy to receive print job requests from clients 330 on behalf of print servers 350. As a result, interface logic 203 uses the same messaging protocol implemented at print servers 350 (e.g., JMF).

In one embodiment, interface logic 204 interfaces with application 310 at a print server to establish a WebSocket connection to connections module 201. Once established, JMF requests may be received at a print server 350. Additionally, responses may be transmitted back to cloud server 306 to set up the connection for the transfer of print jobs. Print jobs may subsequently be received at the print job manager from a client 330 via cloud server 306.

Figure 5:
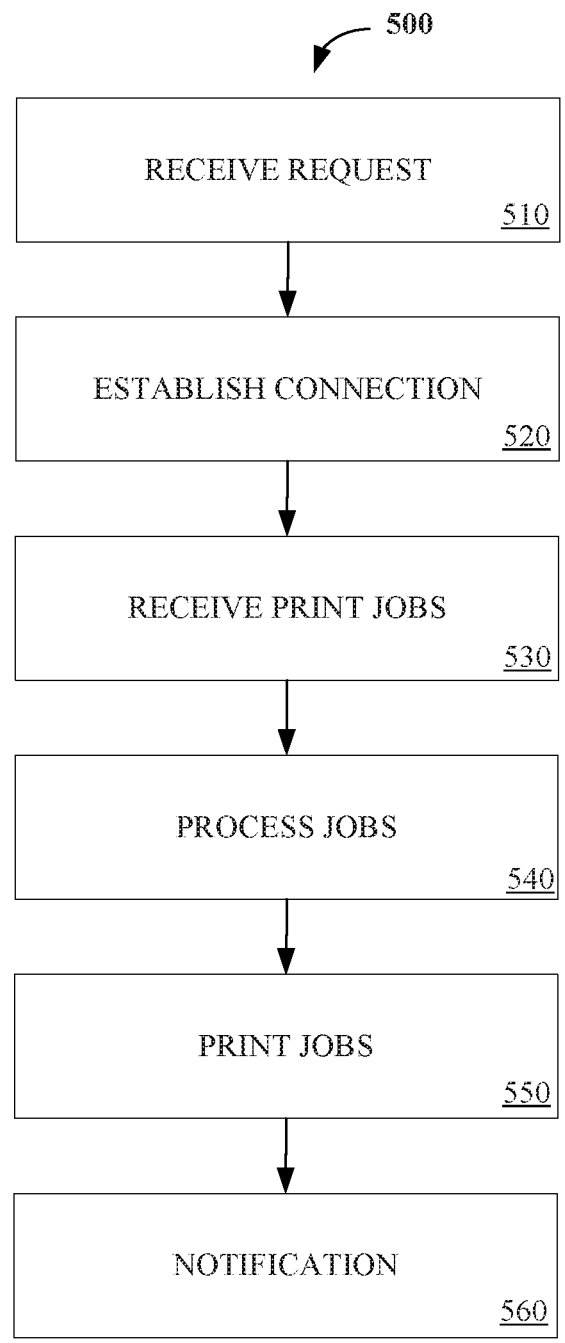
FIG. 5 is a flow diagram illustrating one embodiment of a method for performing print job submission.

FIG. 5 is a flow diagram illustrating one embodiment of a process 500 for performing print job processing. Process 500 may be performed by processing logic that may comprise hardware (e.g., circuitry, dedicated logic, programmable logic, etc.), software (such as instructions run on a processing device), or a combination thereof. In one embodiment, process 500 may be performed by print job submission mechanism 110. The process 500 is illustrated in linear sequences for brevity and clarity in presentation; however, it is contemplated that any number of them can be performed in parallel, asynchronously, or in different orders. In other embodiments it may also be possible to add or remove sequences. For brevity, clarity, and ease of understanding, many of the details discussed with reference to FIGS. 1-4 are not discussed or repeated here.

Process 500 begins at processing block 510, a print request is received at a cloud server from a client device. At processing block 520, a bidirectional asynchronous communication WebSockets connection is established between the cloud server and a print server. At processing block 530, one or more print jobs are received at the print server from the client device via the cloud server. At processing block 540, the print jobs are processed at a print manager within the print server as a part of a print production workflow. At processing block 550, the print jobs are print processed (e.g., printed) at a printing system coupled to the print server. At processing block 560, a notification is provided to the client device from the print server via the cloud server indicating that the print jobs have been processed.

The above-described print job submission mechanism enables cloud services applications to submit print jobs to one or more print servers that are not operating in a cloud environment (e.g., a local network).

Figure 6:
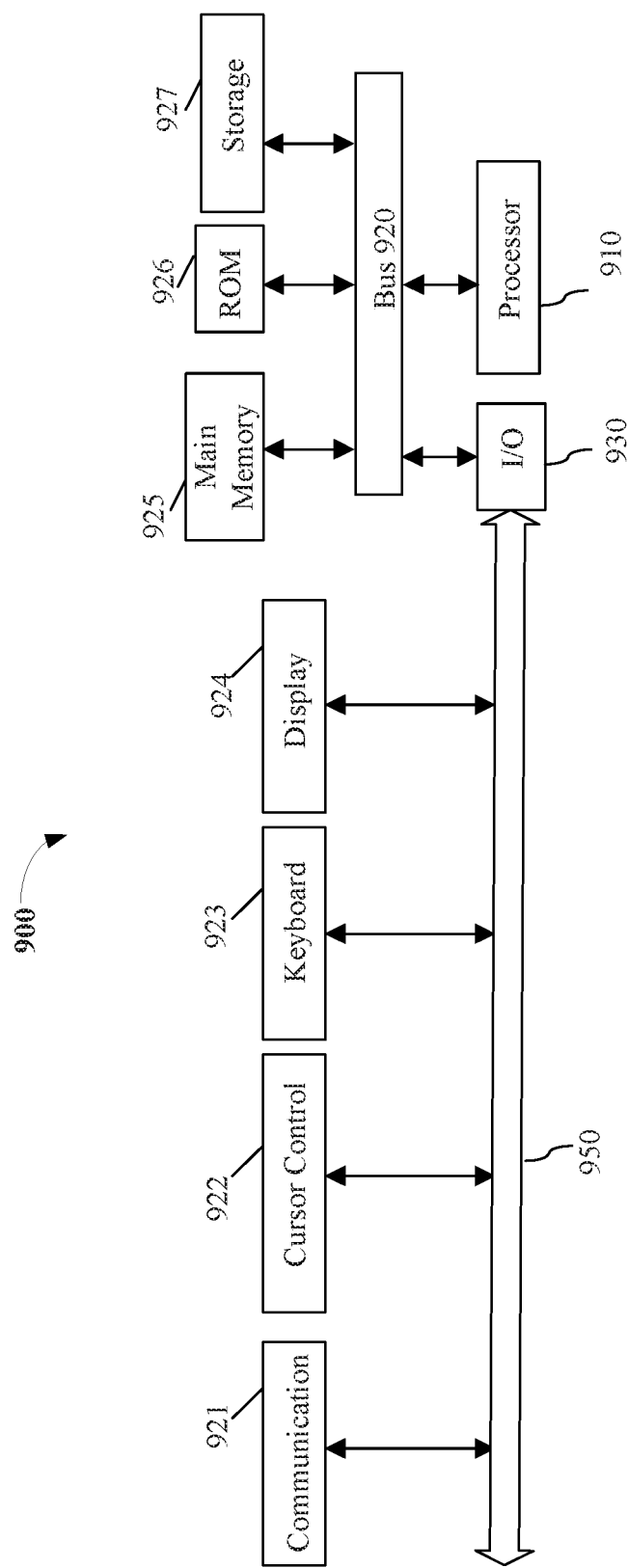
FIG. 6 illustrates a computing device suitable for implementing embodiments of the present disclosure.

FIG. 6 illustrates a computer system 900 on which computing device 120 and/or 121 may be implemented. Computer system 900 includes a system bus 920 for communicating information, and a processor 910 coupled to bus 920 for processing information.

Computer system 900 further comprises a random-access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 927 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., a keyboard (or alphanumeric input device) 923 and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A system comprising:
   a cloud server, including:
   at least one physical memory device configured to store a connections module and print job submission logic; and
   one or more processors coupled with the at least one physical memory device, the one or more processors configured to execute the connections module to register a plurality of print servers located outside of the cloud and provide bidirectional asynchronous communication between the cloud server and each of the plurality of print servers, and the print job submission logic to receive a print job request from a client device external to the cloud server and to transmit the print job request to one of the plurality of print servers located outside the cloud, wherein the print job submission logic comprises interface logic configured to provide a print manager proxy in the cloud to receive the print job requests from the client device that is outside the cloud.

2. The system of claim 1, wherein the interface logic communicates via a messaging protocol implemented at the print server.

3. The system of claim 1, wherein the connections module tracks each of the plurality of print servers.

4. The system of claim 3, wherein the bidirectional asynchronous communication comprises a WebSockets connection.

5. The system of claim 4, wherein the print job submission logic further comprises request logic to receive the one or more print job requests from the client device.

6. The system of claim 5, wherein the request logic receives the requests as hypertext transfer protocol (HTTP) Job Messaging Format (JMF) requests.

7. A system comprising:
a plurality of print servers to host a print manager to process print jobs;
a plurality of client devices to transmit print job requests for processing at the one or more print servers; and
one or more cloud servers to host print job submission logic to receive the print job requests from the plurality of client devices and transmit the print job requests to at least one of the plurality of print servers to be processed at a print manager, wherein the print job submission logic comprises a connections module to register the plurality of print servers and provide bidirectional asynchronous communication between the one or more cloud servers and each of the plurality of print servers, and interface logic to provide a print manager proxy to receive the print job requests from the plurality of client devices.

8. The system of claim 7, wherein the interface logic communicates via a messaging protocol implemented at the one or more print servers.

9. The system of claim 7, wherein the print job submission logic further comprises a connections module to provide bidirectional asynchronous communication with the one or more print servers.

10. The system of claim 9, wherein the bidirectional asynchronous communication comprises a WebSockets connection.

11. The system of claim 10, wherein the print job submission logic further comprises request logic to receive the one or more print job requests from the plurality of client devices.

12. The system of claim 11, wherein the request logic receives the requests as hypertext transfer protocol (HTTP) Job Messaging Format (JMF) requests.

13. The system of claim 10, wherein each of the one or more print servers comprises interface logic to interface with the connections module to establish the WebSockets connection.

14. The system of claim 7, further comprising one or more printing systems coupled to each of the one or more print servers.

15. A computer-implemented method, comprising
registering a plurality of print servers with a cloud server;
receiving a print request at a print manager proxy hosted at the cloud server from a client device; and
establishing a bidirectional asynchronous communication connection between the cloud server and a first of the plurality of print servers; and
transmitting the print request to the first print server for processing.

16. The method of claim 15, wherein the print manager proxy interfaces with an application at the first print server via the bidirectional asynchronous communication connection.

17. The method of claim 16, wherein the print request is received from the client device as a hypertext transfer protocol (HTTP) Job Messaging Format (JMF) request.

18. The method of claim 15, further comprising providing bidirectional asynchronous communication with the first print server.

19. The method of claim 18, wherein the bidirectional asynchronous communication comprises a WebSockets connection.

20. The method of claim 19, further comprising tracking each of the plurality of print servers.

* * * * *